US005294087A

United States Patent [19]

Drabczyk et al.

[11] Patent Number: 5,294,087

[45] Date of Patent: Mar. 15, 1994

[54] ADJUSTABLE KEYBOARD HOLDER FOR COMPUTER WORKSTATION

[75] Inventors: Matthew P. Drabczyk, Westminster; Daniel Starkey, Englewood, both of Colo.

[73] Assignee: Engineered Data Products, Inc., Broomfield, Colo.

[21] Appl. No.: 953,453

[22] Filed: Sep. 29, 1992

Related U.S. Application Data

[63] Continuation of Ser. No. 779,378, Oct. 18, 1991, abandoned.

[51] Int. Cl.[5] .......... F16M 13/00

[52] U.S. Cl. .......... 248/639; 108/138; 108/143; 248/918

[58] Field of Search .......... 248/918, 639, 280.1, 248/281.1, 284, 291; 403/87, 91, 92; 108/138, 143

[56] References Cited

U.S. PATENT DOCUMENTS

| | | | |
|---|---|---|---|
| 2,982,285 | 5/1961 | Edwards | 108/143 |
| 4,625,657 | 12/1986 | Little et al. | 108/138 X |
| 4,644,875 | 2/1987 | Watt | 108/138 X |
| 4,691,888 | 9/1987 | Cotterill | 248/284 |
| 4,826,123 | 5/1989 | Hannah et al. | 248/281.1 X |
| 4,843,978 | 7/1989 | Schmidt et al. | 108/138 |
| 4,988,066 | 1/1991 | Cotterill | 248/281.1 |
| 5,031,867 | 7/1991 | Cotterill | 248/918 X |
| 5,037,054 | 8/1991 | McConnell | 248/918 X |

*Primary Examiner*—David L. Talbott
*Attorney, Agent, or Firm*—Glenn L. Webb

[57] ABSTRACT

An adjustable keyboard holder. The present invention provides a keyboard holder that is infinitely adjustable both angularly and vertically. The keyboard holder includes a locking apparatus that allows ease of adjustment as well as restraining the keyboard holder from movement when locked. This keyboard holder allows adjustment without interfering with the use of an under-desk visual display terminal.

43 Claims, 6 Drawing Sheets

ADJUSTABLE KEYBOARD HOLDER FOR COMPUTER WORKSTATION

This is a continuation of application Ser. No. 779,378 filed Oct. 18, 1991, now abandoned.

BACKGROUND OF THE INVENTION

1. Field of the Invention

This invention relates to the field of adjustable keyboard holders, particularly for keyboard holders for computer workstations.

2. Statement of the Problem

Persons working with keyboards, such as for computer systems, often are limited in positions available for using the keyboards. At best, the keyboards are adjustable in only a few positions. Not only are these keyboards normally ergonomically inadequate, but keyboard operators are increasingly becoming inflicted with carpal tunnel syndrome from the use of such keyboards. Carpal tunnel syndrome, a debilitating injury which is becoming very prevalent, occurs from repetitive wrist motions. More and more governments are requiring that keyboards have the capacity for frequent changes in position to reduce the incidence of carpal tunnel syndrome.

The American National Standard for Human Factors Engineering of Visual Display Terminal Workstations set forth design considerations for furniture designers. These standards include specified ranges of height and adjustability of keyboard support surfaces. These ranges include that the angle between the upper arm and the forearm of the seated person using the keyboard be greater than seventy degrees and less than one hundred thirty five degrees. The keyboard support surface should also range in height above the floor from twenty-three inches to twenty-eight inches to accommodate various heights of keyboard users. Another consideration is that the adjustment controls be easily accessible and usable, to encourage their use. Studies have shown that by frequently changing the position of the keyboard, carpal tunnel syndrome can be avoided.

There have been some prior art attempts to provide adjustable holders for keyboards. These typically have a ratchet-type mechanism to allow the holder to be adjusted through a few predetermined positions. Many of these keyboard holders include a center-post structure which prevents them from being usable on an underdesk CRT workstation or on a pop-up CRT workstation.

Thus, a problem exists in providing a keyboard holder being infinitely adjustable and usable with visual display terminal workstation.

3. Solution to the Problem

The present invention solves this problem and others by providing an easily adjustable keyboard holder.

The keyboard holder of the present invention provides a keyboard holder that is infinitely adjustable within a range of motion.

The present invention provides a slidable keyboard holder drawer which is usable in a visual display terminal workstation.

The present invention provides a keyboard holder that is quickly adjustable and securely locking in position.

These solutions to the problem of adjustable keyboard holders and others are provided by the present invention as discussed in the following description.

SUMMARY OF THE INVENTION

The present invention provides an adjustable keyboard holder that has particular utility for computer workstations. The adjustable keyboard holder, in a preferred embodiment, includes mounting brackets for slidably mounting the keyboard holder beneath the worksurface of the workstation. The mounting brackets are designed so not to interfere with the use of an underdesk visual display terminal.

The keyboard holder includes a tray support that is mounted on a rod beneath the tray support. Each end of the rod is also pivotally mounted on a support arm linkage which in turn is pivotally mounted onto the mounting brackets. A portion of the support arm linkage is also mounted to the underside of the tray support. These support arm linkages are resiliently biased upwards by springs secured between end of the support arm linkage and the mounting brackets. The pivotal mounting of the tray support allows the tray support and the keyboard mounted thereon to pivot angularly to change the angular position of the keyboard. The pivotal mounting of the support arm linkages to the mounting brackets allow vertical adjustment of the tray support and the keyboard thereon.

The keyboard holder also includes apparatus to restrain the tray support from accidental or unintentional movement. Friction washers are provided on the rod to provide this restrainment. The pivotal mounting of tray support on the rod and the support arm linkages on the rod are frictionally restrained by the friction washers. A camming arrangement is included to release this frictional restrainment. A resiliently biased lever is pivotally mounted on the rod to freely rotate thereon. A cam surface having a raised surface and a lowered surface is formed on one side of the lever. An engaging cam surface having a raised surface and a lowered surface is formed on a block slidably mounted on the rod.

The lever is normally biased so the raised portion of the camming surfaces engage in the lowered surface of the opposing cam surface. In this position, the frictional restrainment of the pivotal mounting is in effect. When it is desired to adjust the position of the keyboard, the lever is rotated, causing the raised portions of the cam surfaces to engage one another. This slides the pivotal mounting attachments along the rod to relieve the frictional restrainment of the pivotal mounting attachments. Thus, the pressure is relieved and the keyboard can be adjusted, not only angularly but vertically. Once the desired position is found, the lever is released and the raised portions of the cam surfaces engage in the opposing lowered cam surface portions, which causes the pivotal mounting attachments to once again be frictionally restrained.

These and other features will be evident from the ensuing description of a preferred embodiment taken in conjunction with the drawings.

BRIEF DESCRIPTION OF THE DRAWINGS

FIG. 5 (*b*) is a partial view of the present invention in the locked position;

FIG. 6(*b*) is a side view of the present invention showing the ranges of motion of the keyboard holder.

DETAILED DESCRIPTION

The present invention provides an adjustable keyboard holder, particularly for a workstation. A preferred embodiment of the present invention is for an adjustable keyboard holder slidably mounted in a underdesk visual display terminal workstation, such as the workstation disclosed in U.S. Pat. No. 4,755,009, issued to the present assignee. It is to be expressly understood that the present invention is not to be limited to the description of the preferred embodiment which is meant for explanatory purposes only. Other embodiments and variations are considered to be within the scope of the inventive concept. For instance, the keyboard holder of the present invention has utility for above desk visual display terminal workstations, such as disclosed in Fritz U.S. Pat. No. 4,316,082.

Figure 1:
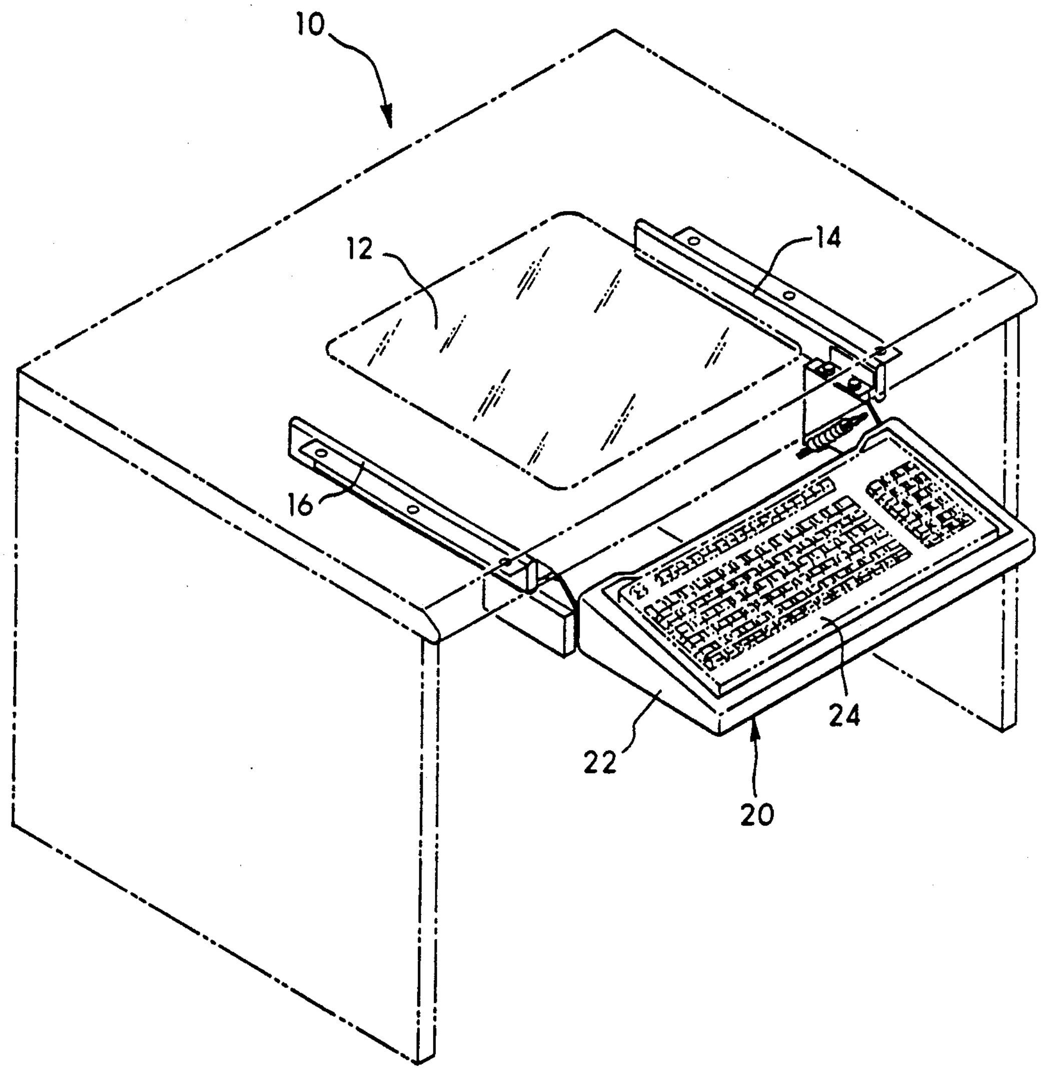
FIG. 1 is a perspective view of the present invention mounted on a workstation.
Figure 2:
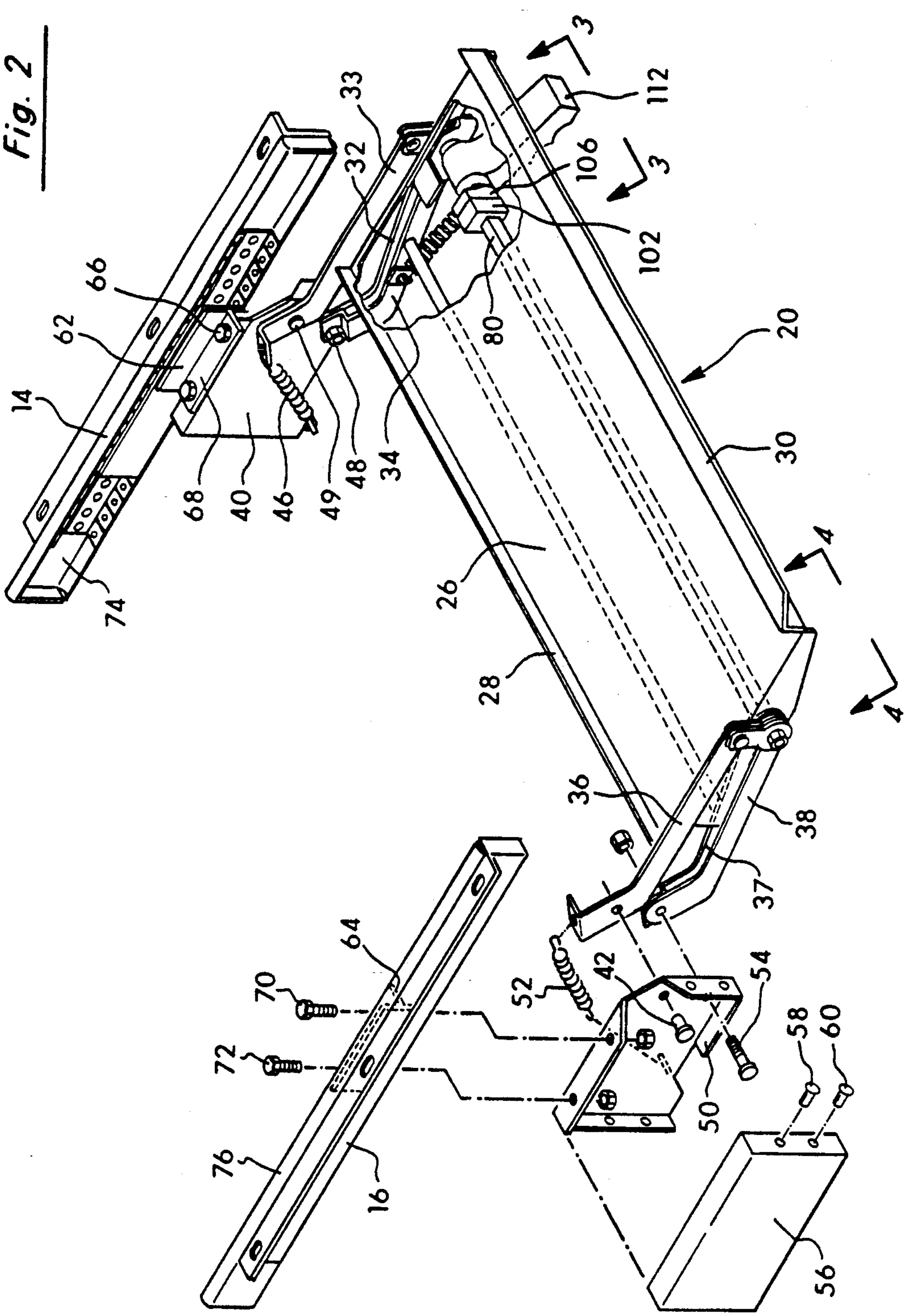
FIG. 2 is an exploded view of a preferred embodiment of the present invention.

The preferred embodiment of the present invention is illustrated in FIGS. 1-6. As shown in FIG. 1, workstation 10 includes central transparent panel 12. A visual display terminal (not shown), such as a computer CRT, is normally mounted beneath workstation 10 visible through panel 12 to an operator seated in front of the workstation. Brackets 14, 16 are mounted underneath the top of workstation 12 straddling panel 12. Brackets 14, 16 are conventional in design, as used for mounting sliding drawers.

Keyboard holder 20 is secured to workstation 10 to slide from an out of the way position beneath the top of workstation 10 to a working position as shown in FIG. 1. Keyboard holder 20, shown in FIG. 1, includes molded plastic tray 22 which holds most types and sizes of keyboards 24. Keyboard tray 24 is supported by tray support 26, shown in FIG. 2, on which tray 24 snaps over the top of support 26. Tray support 26 includes rear upstanding edge 28 and front edge 30 which extends upward and outward from support 26. Edges 28, 30 engage with keyboard tray 24 to prevent keyboard tray 24 from moving relative to support 26.

Tray support 26 is pivotally mounted, as discussed in greater detail below, to support arms 32, 33, 34, 36, 37, 38. Support arms 32-38 are in turn pivotally mounted onto mounting plates 40, 42, respectively. Support arm 32 is pivotally mounted onto mounting plate 40 by rivet 44. Spring 46 secured on a first end to the upper end of support arm 32 and on the opposing end to mounting plate 40 to resiliently bias support arm 32 and tray support 26 upwards. Support arm 33 and parallel support arm 34 is pivotally mounted to mounting plate 40 by bolt 48. Support arm 36 is pivotally mounted on mounting plate 42 by rivet 50 and biased by spring 52 in a similar fashion as support arm 32. Support arm 37 and parallel support arm 38 are pivotally mounted on mounting plate 42 by bolt 54. Cover 56 is secured to mounting plate 42 by pins 58, 60. A similar cover (not shown) is secured to mounting plate 40.

Mounting plates 40, 42 are affixed to slide brackets 62, 64, respectively by bolts 66-72. Slide brackets 62, 64 slide within extendible tracks 74, 76 on mounting brackets 14, 16. The design and operation of slide brackets 62, 64 and mounting brackets 14, 16 are conventional in design and are not discussed in any further detail. Thus, support tray 26, along with keyboard tray 22 and keyboard 24 are movable from an out of the way position beneath the upper surface of workstation 10 to a working position shown in FIG. 1. There is no structure that will interfere with the use of the visual display terminal beneath panel 12 when keyboard 24 is in the working position. This feature is a significant improvement over previous adjustable keyboard holders which used centerpost adjustment which interfered with the use of underdesk visual display terminals.

Figure 3:
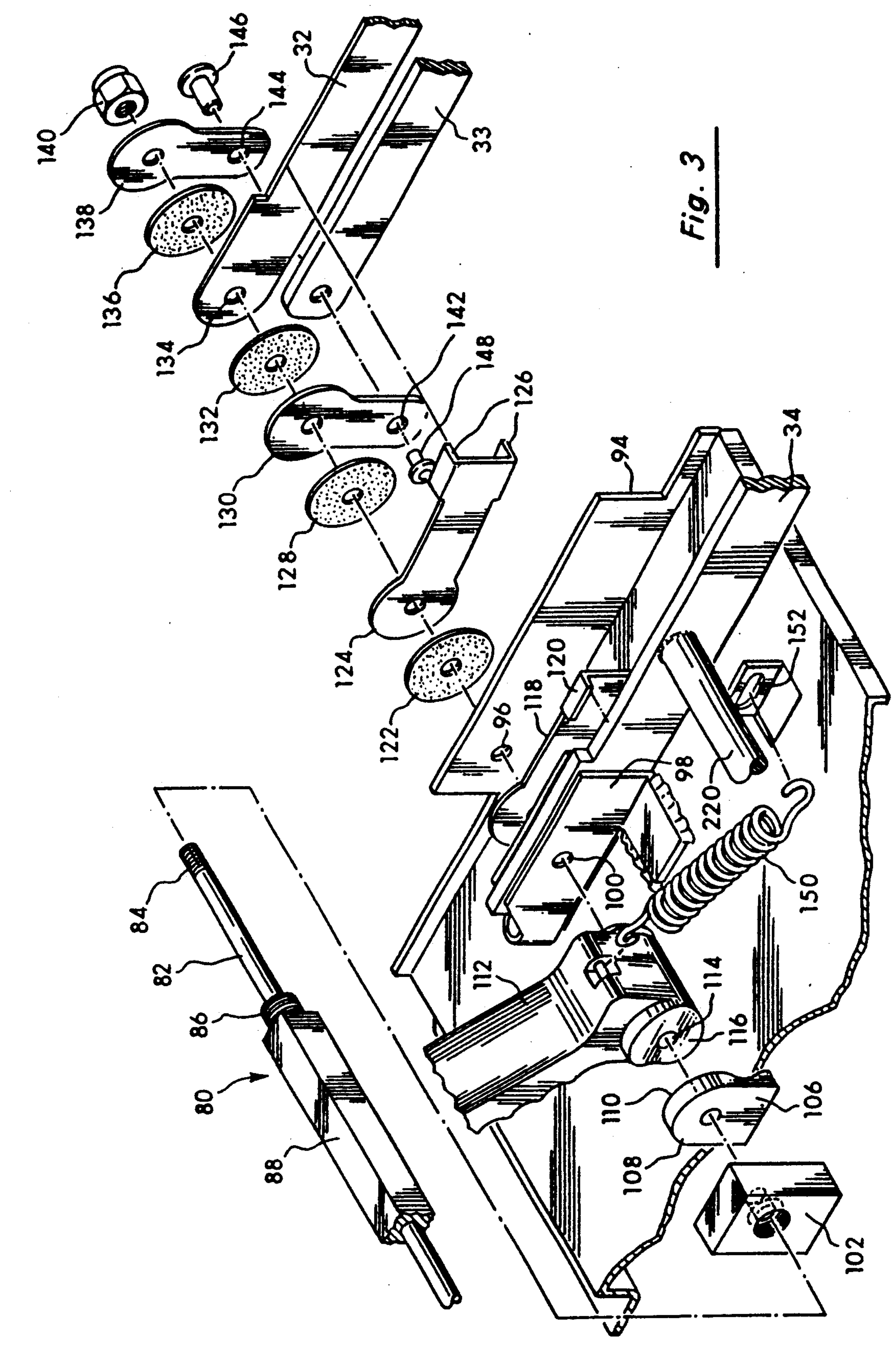
FIG. 3 is an exploded view of the right underside of the embodiment of FIG. 2.
Figure 4:
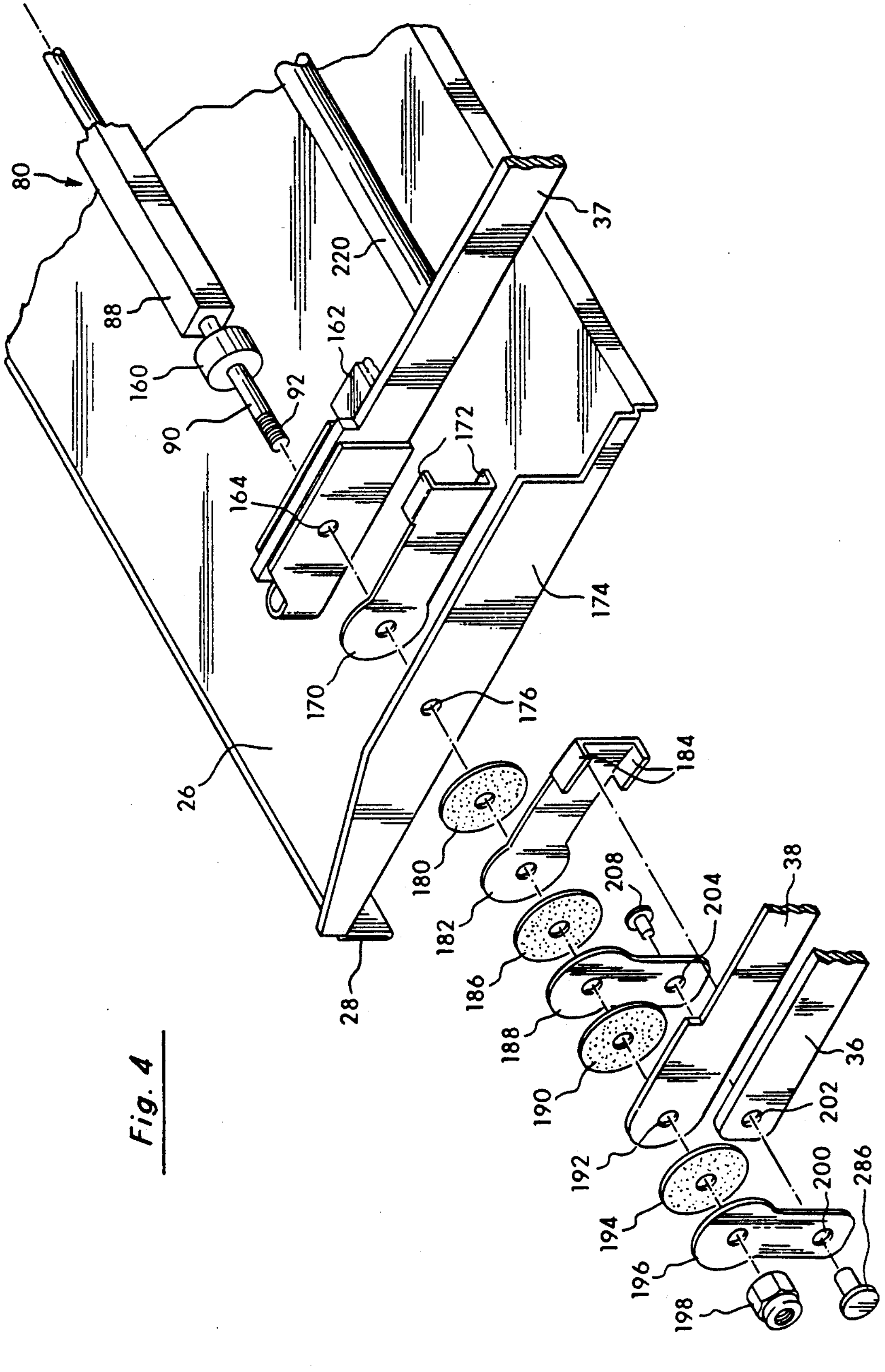
FIG. 4 is an exploded view of the left underside of the embodiment of FIG. 2.

As discussed above, tray support 26 is pivotally mounted to support arms 32, 33, 34, 36, 37, 38. Support arms 32, 33, 34, shown in FIG. 3, are mounted on rod 80 which, in turn, is pivotally secured to tray support 26. Rod 80 includes end portion 82 which has a reduced cylindrical diameter with threaded end portion 84. Threaded mid-portion 86 on rod 80 is spaced from end portion 82 abutting against square mid-portion 88. On the opposing end of rod 80, shown in FIG. 4, is reduced cylindrical diameter portion 90 having threaded end portion 92.

Tray support 26 includes side edge portion 94 having mounting hole 96 for cylindrical portion 82 of rod 80 to extend through. Support bracket 98 is affixed on the underside of tray support 26, shown in FIG. 3, for pivotally mounting support arm 34 to tray support 26. Hole 100 extends through support bracket 98 to be in line with hole 96 of upstanding portion 94. Support arm 34 includes a mating hole (not shown) for rod 80 to extend through to mount support arm 34 to support bracket 98.

Block 102 having threaded hole 104 extending partially therein is inserted on rod 80 so that threaded portion 86 engages threaded hole 104. Adjacent block 102 is cam block 106 having hole 108 which is slidably mounted over rod 80. Cam surface 110 is formed on camming block 106 as described below. Lever 112 is also slidably inserted onto rod 80 through hole 114 formed in lever 112. Cam surface 116 is formed on lever 112 for engagement with cam surface 110 as discussed below.

End portion 82 is further inserted through hole 100 of support bracket 98 and the hole formed in support arm 34 to pivotally mount support arm 34 to support bracket 98. Spring arm 118 is mounted onto pivot arm adjacent support bracket 34. Flanges 120 on spring arm 118 engage support arm 34 by crimping the ends of flanges 120 over support arm 34. End portion 82 is inserted through hole 96 of upstanding side portion 94 to pivotally mount pivot arm on 80 on tray support 26.

Friction washer 122, formed from a fibrous braking material known in the art, is mounted on rod 80 adjacent upstanding portion 94. Spring arm 124 is mounted on rod 80 on the opposing side of friction washer 122. Flanges 126 on spring arm 124 engage support arm 32 similar to the engagement of flanges 120 on support arm 34. Friction washer 128 is mounted on rod 80 adjacent spring arm 124 and adjacent arm 130 which is also rotatably mounted on rod 80. On the opposing side of arm 130 is mounted friction washer 132 which abuts against support arm 32. Rod 80 extends through hole 134 on support arm 32 allowing rotation relative thereto. Friction washer 136 is mounted on rod 80 between support arm 32 and arm 138. Nut 140 threadingly engages threaded portion 84 on rod 80 to apply pressure between the components mounted on rod 80 between block 102 and nut 138. The friction washers eliminate metal-to-metal contact and provide frictional pressure between the components. The present invention is not meant to be limited to the use of fibrous friction washers, however. Other types of friction washers, such as leather, metal, or even no friction washers at all are contemplated under the present invention.

Spring arms 124 and 118 resiliently bias support arms 32, 34 away from each other to cause cam surfaces 110 and 114 to engage one another.

Spring 50 is secured on one end by lever 112 and on the opposing end to clip 152 affixed on tray support 26. Spring 50 biases lever 112 in an upright position so cam surfaces 110, 114 engage one another.

Support arm 33 is affixed to arms 130 and 138 through holes 142, 144, respectively, by pins 146, 148. The mounting of support arm 33 to arms 130, 138, support arm 34 and support arm 32 to rod 80 and the opposing ends of arms 32, 33, 34 to mounting bracket 40 forms a four bar linkage to allow tray support 26 to pivot downward and upward relative to desk 10 and to the keyboard operator and also allow tray support 26 to be adjusted in a vertical plane.

On the opposing end of tray support 26, shown in FIG. 4, cylindrical bushing 160 is inserted over end portion 90 of rod 80. End portion 92 is inserted through hole 164 of support bracket 162 and through a hole in support arm 37 to affix support arm 37 to tray support 26 while allowing relative pivoting therewith. Spring arm 170 is slidably inserted onto rod 80 with flanges 172 engaging support arm 37 to resiliently bias support arm 37 inward. Rod 80 is further secured to tray support 26 by insertion through hole 176 formed in side edge portion 174. Friction washer 180 is mounted on rod 80 adjacent side edge portion 174. Spring arm 182 is mounted on rod 80 on the opposing side of friction washer 174. Flanges 182 on spring arm 184 engage support arm 36 similar to the engagement of flanges 172 on support arm 37.

Friction washer 186 is mounted on rod 80 adjacent spring arm 182 and adjacent arm 188 which is also rotatably mounted on rod 80. On the opposing side of arm 188 is mounted friction washer 190 which abuts against support arm 36. Rod 80 extends through hole 192 on support arm 36 allowing rotation relative thereto. Friction washer 194 is mounted on rod 80 between support arm 36 and arm 196. Nut 198 threadingly engages threaded portion 92 on rod 80 to apply pressure between the components mounted on rod 80 between block 102 and nut 198. The friction washers eliminate metal-to-metal contact and provide frictional pressure between the components. Spring arms 170 and 182 resiliently bias support arms 36, 37 away from each other to cause cam surfaces 110 and 114 to engage one another.

Support arm 38 is affixed to arms 188 and 196 through holes 204, 200, respectively, by pins 206, 208. The mounting of support arm 38 to arms 188, 196, support arm 36 and support arm 37 to rod 80 and the opposing ends of arms 36, 37, 38 to mounting bracket 42 forms a four bar linkage on this end of tray support to allow tray support 26 to pivot downward and upward relative to desk 10 and to the keyboard operator.

Rod 220 extends between support arms 34, 37 to form an additional support for tray support 26 and to ensure that the four bar linkages on each side of tray support 26 move in unison.

Figure 5A:
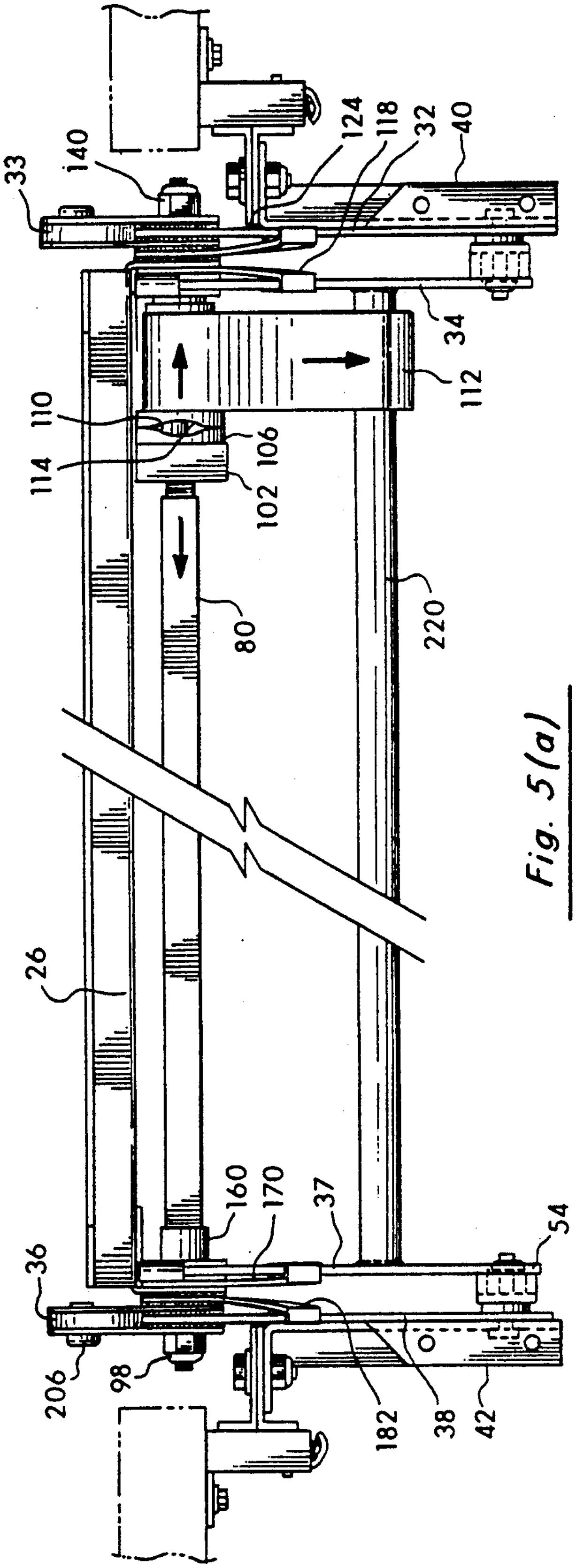
FIG. 5(*a*) is an underside view of the embodiment of FIG. 2 in the adjustment mode.
Figure 5B:
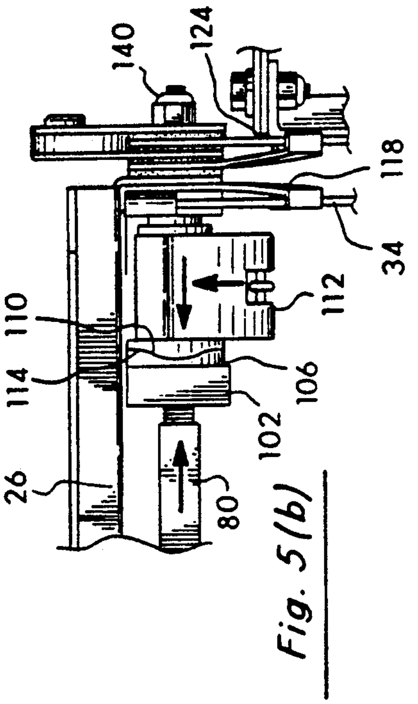

As shown in FIG. 5(*a*), which corresponds to lever 112 being moved towards support tray 26 against the bias of spring 150, lever 112 is rotated so that the raised portion of cam surface 114 engages the raised portion of cam surface 110 on block 102. This causes rod 80 to move in the direction of arrow 222 and lever 112 to move in the direction of arrow 224 since neither is affixed to tray support 26. This movement relieves pressure of support arms 32, 33, 34, 36, 37, 38 against friction washers 122, 128, 132, 136, 180, 186, 190, 194, thus allowing the support arms as well as tray support 26 to freely pivot.

Once lever 112 is released and allowed to return back to the normal biased position, shown in FIG. 5(*b*), the raised portion of cam surface 114 engages the lowered portion of cam surface 110 and vice versa. This causes rod 80 to move in the direction of 222′ and lever 112 to move in the direction 224′. This movement causes the pressure to be reapplied on the friction washers against the support arms and the tray support. This locks the tray support in the adjusted position.

Figure 6A:
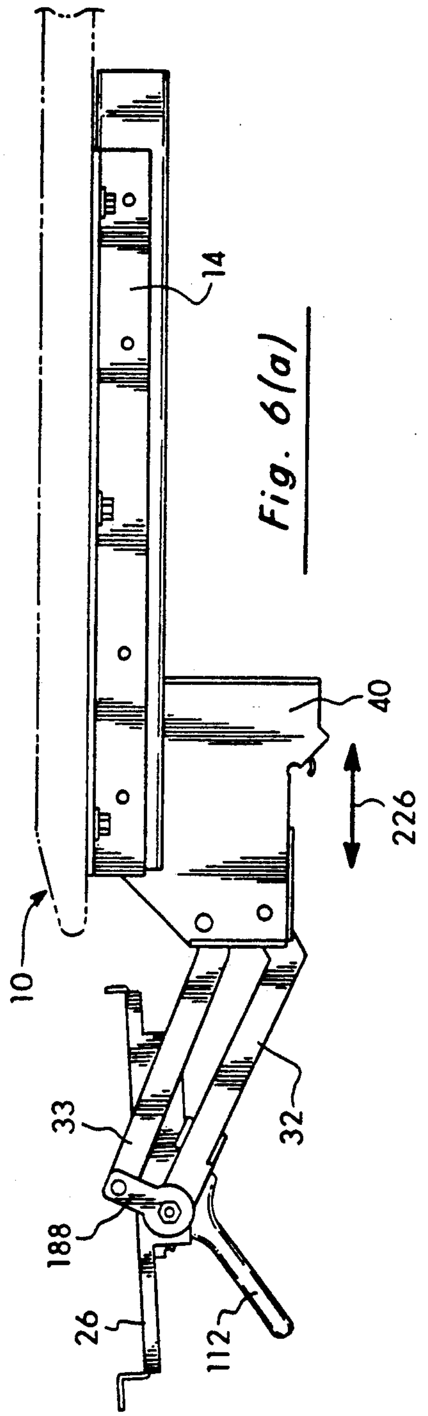
FIG. 6 (*a*) is a side view of the present invention in the locked position.
Figure 6B:
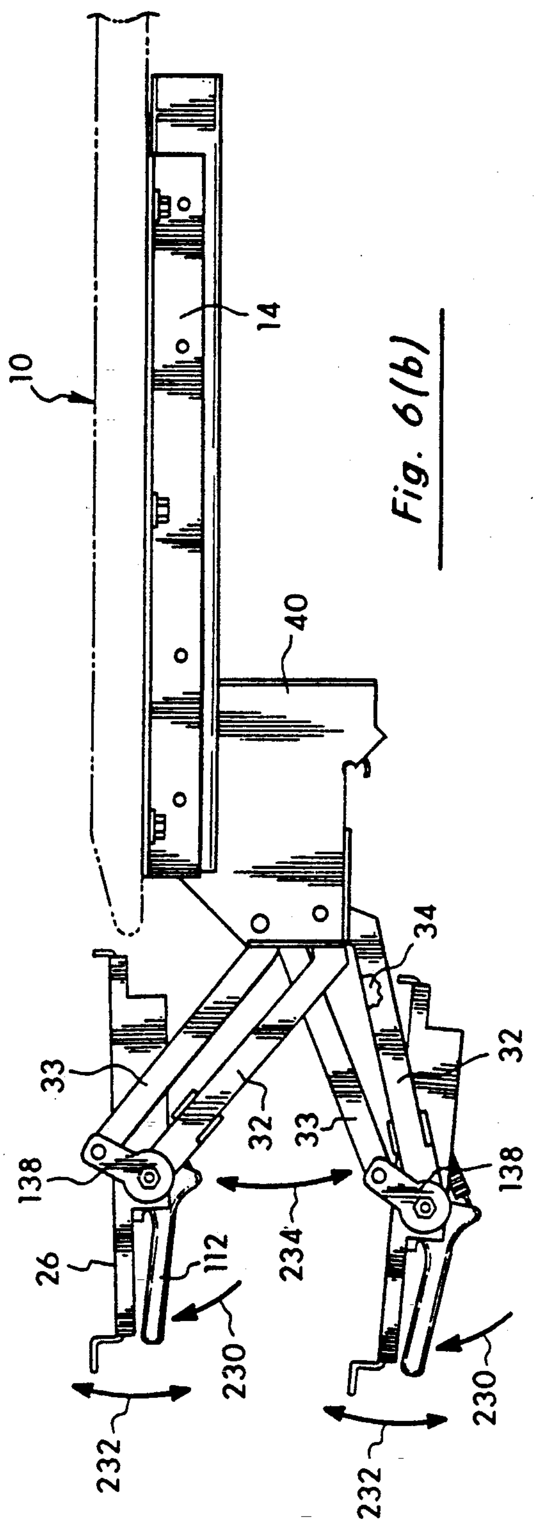

Tray support 26 is shown in FIG. 6(*a*) in the locked position. In the preferred embodiment, tray support 26 as mounted on bracket 40 is pulled out relative to workstation 10 along the direction of arrow 226. The tray support is locked into the desired horizontal position by well known detents.

The full range of movement of tray support 26 is shown in FIG. 6(*b*). With lever 112 pulled inward in the direction of arrow 230, tray support 26 can be pivoted about rod 80 in the direction of arrow 232 as well as raised or lowered by the support arms about mounting brackets 40, 42 about arrow 234. Thus, the keyboard can be infinitely adjusted, not only in the vertical plane according to the height of the keyboard operator, but angularly at any desired height. This adjustment can be accomplished by one operation of lever 112. These features are important since the present invention allows the keyboard to adjusted infinitely angularly and vertically within a range of motions rather than merely having a few preselected positions.

The present invention is not meant to be limited by the above description of a preferred embodiment set forth for explanatory purposes but encompasses other embodiments and modifications within the scope of the inventive concept.

We claim:

1. An adjustable keyboard holder for a computer workstation, said adjustable keyboard holder comprises:
   - a keyboard tray support;
   - means for mounting said keyboard support to a computer workstation;
   - means for independently and infinitely adjusting the angular position of said keyboard tray support relative to the computer workstation;
   - means for independently and infinitely adjusting the vertical position of said keyboard tray support relative to the computer workstation; and
   - a single actuator for releasing said angular adjusting means and said vertical adjusting means for adjustment and for locking said angular adjusting means and said vertical adjusting means in a selected angular and vertical position.

2. The adjustable keyboard holder of claim 1 wherein said single actuator is mounted adjacent said keyboard tray support.

3. The adjustable keyboard holder of claim 1 wherein said angular adjustment means include:
   - an elongated member extending beneath said keyboard tray support;

means for pivotally mounting said keyboard tray support on said elongated member;

means for frictionally clamping said keyboard tray support relative to said elongated member to prevent pivoting movement of said keyboard tray support on said elongated member; and means on said single actuator for disengaging said frictional clamping means to allow adjustment of the angular position of said keyboard tray support and for engaging said frictional clamping means to lock said keyboard tray support in a selected angular position.

4. The adjustable keyboard holder of claim 3 wherein said means for frictionally clamping said keyboard tray support includes:

friction washers mounted between said means for pivotally mounting said keyboard tray support on said elongated member;

spring members for resiliently biasing said friction washers against said pivotally mounting means; and said means on said single actuator operatively engages said spring members to remove said resilient biasing on said friction washers to allow angular adjustment of said keyboard tray support and disengages said spring members to replace said resilient biasing against said friction washers to lock said keyboard tray support in a selected angular position.

5. The adjustable keyboard holder of claim 4 wherein said single actuator includes:

a lever rotatably mounted on said elongated member;

a first cam surface formed on said lever;

a second cam surface formed on a portion of said elongated member adjacent said second cam surface wherein said first cam surface engages said second cam surface as said lever is rotated relative to said elongated member to move said elongated member along its longitudinal axis to remove the resilient bias of said spring members against said friction washers.

6. The adjustable keyboard holder of claim 4 wherein said means for independently and infinitely adjusting the vertical position of said keyboard tray support relative to the workstation includes;

pivotal linkage members between said keyboard tray support and said computer workstation;

said pivotal linkage members pivotally mounted on said elongated member;

means for frictionally clamping said pivotal linkage members relative to said elongated member to prevent vertical movement of said keyboard tray support; and said single actuator releases said frictional clamping means on said pivotal linkage members to allow vertical adjustment of said keyboard tray support and reengages said frictional clamping means to clamp said pivotal linkage members to lock said keyboard tray support in a selected vertical position.

7. The adjustable keyboard holder of claim 1 wherein said means for independently and infinitely adjusting the vertical position of said keyboard tray support relative to the workstation includes;

pivotal linkage members between said keyboard tray support and said workstation; and said single actuator releases said pivotal linkage members to allow vertical adjustment of said keyboard tray support and clamps said pivotal linkage members to lock said keyboard tray support in a selected vertical position.

8. The adjustable keyboard holder of claim 1 wherein said means for mounting said keyboard tray support to said computer workstation includes:

means for allowing horizontal, vertical and angular adjustment of said keyboard tray support without interfering with an underdesk visual display of said computer workstation.

9. An adjustable keyboard holder assembly for mounting onto a computer workstation having a support assembly for supporting an underdesk visual display terminal beneath the working surface of the computer workstation, said adjustable keyboard holder assembly comprising:

a keyboard tray support;

means for providing vertical adjustment of said keyboard tray support without interfering with the underdesk visual display terminal;

means for providing horizontal movement of said keyboard tray support from an operating position extending beyond the edge of the computer workstation to a storage position substantially beneath the working surface of the computer workstation without interfering with the underdesk visual display terminal; and means for mounting said adjustable keyboard tray support assembly to the computer workstation.

10. The adjustable keyboard holder assembly of claim 9 wherein said vertical adjusting means include:

an elongated member extending beneath said keyboard tray support so not to interfere with the under desk visual display terminal; and pivoting linkage members extending along the sides of said keyboard tray support and pivotally secured to said elongated member to allow vertical adjustment of said keyboard tray support relative to said workstation.

11. The adjustable keyboard holder assembly of claim 10 wherein said elongated member extends beneath a front portion of said keyboard tray support so not to interfere with the underdesk visual display terminal.

12. The adjustable keyboard holder assembly of claim 10 wherein said horizontal adjusting means include:

roller tracks extending beneath the upper surface of the computer workstation and along the sides of the underdesk visual display terminal; and rollers mounted on said pivoting linkage members to allow horizontal adjustment of said keyboard tray support.

13. The adjustable keyboard holder assembly of claim 10 wherein said vertical adjustment means include:

means for frictionally clamping said keyboard tray support relative to said elongated member to prevent pivoting movement of said keyboard tray support on said elongated member; and a single actuator for disengaging said frictional clamping means to allow adjustment of the vertical position of said keyboard tray support and for engaging said frictional clamping means to lock said keyboard tray support in a selected vertical position.

14. The adjustable keyboard holder assembly of claim 13 wherein said means for frictionally clamping said keyboard tray support includes:

friction washers mounted between said means for pivotally mounting said keyboard tray support on said elongated member;

spring members for resiliently biasing said friction washers against said pivotally mounting means to clamp said keyboard tray support in place; and a single actuator operatively engages said spring members to remove said resilient biasing on said friction washers to allow vertical adjustment of said keyboard tray support and disengages said spring members to replace said resilient biasing against said friction washers to lock said keyboard tray support in a selected vertical position.

15. The adjustable keyboard holder assembly of claim 14 wherein said single actuator includes:

a lever rotatably mounted on said elongated member;

a first cam surface formed on said lever;

a second cam surface formed on a portion of said elongated member adjacent said first cam surface wherein said first cam surface engages said second cam surface as said lever is rotated relative to said elongated member to move said elongated member along its longitudinal axis to remove the resilient bias of said spring members against said friction washers.

16. The adjustable keyboard holder assembly of claim 9 wherein said pivoting linkage members are pivotal about horizontal axis adjacent a front portion of said keyboard tray support so not to interfere with the underdesk visual display terminal and about horizontal axes adjacent the rear of said keyboard tray support.

17. The adjustable keyboard holder assembly of claim 9 wherein said adjustable keyboard holder assembly includes:

a single actuator for releasing said vertical adjusting means for adjustment and for locking said vertical adjusting means in a selected vertical position.

18. The adjustable keyboard holder assembly of claim 9 wherein said adjustable keyboard holder assembly further includes:

means for providing angular adjustment of said keyboard support tray without interfering with the underdesk visual display terminal.

19. The adjustable keyboard holder assembly of claim 18 wherein said means for angularly adjusting said keyboard tray support includes:

an elongated member extending beneath said keyboard tray support; and pivoting linkage members extending along the sides of said keyboard tray support and pivotally secured to said elongated member to allow angular adjustment of said keyboard tray support relative to said workstation.

20. The adjustable keyboard holder assembly of claim 19 wherein said elongated member extends beneath a front portion of said keyboard tray support.

21. The adjustable keyboard holder assembly of claim 20 wherein said pivoting linkage members are pivotal about horizontal axes adjacent a front portion of said keyboard tray support and about horizontal axes adjacent the rear of said keyboard tray support.

22. An adjustable keyboard holder assembly for mounting onto a computer workstation having a support assembly for supporting an underdesk visual display terminal beneath the working surface of the computer workstation, said adjustable keyboard holder assembly comprising:

a keyboard tray support;

means for providing angular adjustment of said keyboard tray support without interfering with the underdesk visual display terminal;

means for providing horizontal movement of said keyboard tray support from an operating position extending beyond the edge of the computer workstation to a storage position substantially beneath the working surface of the computer workstation without interfering with the underdesk visual display terminal; and means for mounting said adjustable keyboard tray support assembly to the computer workstation.

23. The adjustable keyboard holder assembly of claim 22 wherein said angular adjusting means include:

an elongated member extending beneath said keyboard tray support so not to interfere with the underdesk visual display terminal; and pivoting linkage members extending along the sides of said keyboard tray support and pivotally secured to said elongated member to allow angular adjustment of said keyboard tray support relative to said workstation.

24. The adjustable keyboard holder assembly of claim 23 wherein said elongated member extends beneath a front portion of said keyboard tray support so not to interfere with the underdesk visual display terminal.

25. The adjustable keyboard holder assembly of claim 22 wherein said pivoting linkage members are pivotal about horizontal axes adjacent a front portion of said keyboard tray support and about horizontal axes adjacent the rear of said keyboard tray support.

26. The adjustable keyboard holder assembly of claim 23 wherein said horizontal adjusting means include:

roller tracks extending beneath the upper surface of said computer workstation and along the sides of the underdesk visual display terminal; and rollers mounted on said pivoting linkage members to allow horizontal adjustment of said keyboard tray support.

27. The adjustable keyboard holder assembly of claim 23 wherein said angular adjustment means include:

means for frictionally clamping said keyboard tray support relative to said elongated member to prevent pivoting movement of said keyboard tray support on said elongated member; and a single actuator for disengaging said frictional clamping means to allow adjustment of the angular position of said keyboard tray support and for engaging said frictional clamping means to lock said keyboard tray support in a selected angular position.

28. The adjustable keyboard holder assembly of claim 27 wherein said means for frictionally clamping said keyboard tray support includes:

friction washers mounted between said means for pivotally mounting said keyboard tray support on said elongated member;

spring members for resiliently biasing said friction washers against said pivotally mounting means to clamp said keyboard tray support in place; and said means on said single actuator operatively engages said spring members to remove said resilient biasing on said friction washers to allow angular adjustment of said keyboard tray support and disengages said spring members to replace said resilient biasing against said friction washers to lock said keyboard tray support in a selected angular position.

29. The adjustable keyboard holder assembly of claim 28 wherein said single actuator includes:
a lever rotatably mounted on said elongated member;
a first cam surface formed on said lever;
a second cam surface formed on a portion of said elongated member adjacent said first cam surface wherein said first cam surface engages said second cam surface as said lever is rotated relative to said elongated member to move said elongated member along its longitudinal axis to remove the resilient bias of said spring members against said friction washers.

30. The adjustable keyboard holder assembly of claim 22 wherein said adjustable keyboard holder assembly includes:
a single actuator for releasing said angular adjusting means for adjustment and for locking said angular adjusting means in a selected angular position.

31. The adjustable keyboard holder assembly of claim 22 wherein said adjustable keyboard holder assembly further includes:
means for providing vertical adjustment of said keyboard tray support without interfering with the underdesk visual display terminal.

32. The adjustable keyboard holder assembly of claim 31 wherein said means for vertically adjusting said keyboard tray support includes:
an elongated member extending beneath said keyboard tray support so not to interfere with the underdesk visual display terminal; and
pivoting linkage members extending along the sides of said keyboard tray support and pivotally secured to said elongated member to allow vertical adjustment of said keyboard tray support relative to said workstation.

33. The adjustable keyboard holder assembly of claim 32 wherein said elongated member extends beneath a front portion of said keyboard tray support so not to interfere with the underdesk visual display terminal.

34. The adjustable keyboard holder assembly of claim 32 wherein said pivoting linkage members are pivotal about horizontal axes adjacent a front portion of said keyboard tray support and about horizontal axes adjacent the rear of said keyboard tray support so not to interfere with the visual display terminal.

35. An adjustable keyboard holder assembly for mounting onto a computer workstation having a support assembly for supporting an underdesk visual display terminal beneath the working surface of the computer workstation, said adjustable keyboard holder assembly comprising:
a keyboard tray support;
means for providing angular and vertical adjustment of said keyboard tray support without interfering with the underdesk visual display terminal;
means for providing horizontal movement of said keyboard tray support from an operating position extending beyond the edge of the computer workstation to a storage position substantially beneath the working surface of the computer workstation without interfering with the underdesk visual display terminal; and
means for mounting said adjustable keyboard tray support assembly to the computer workstation.

36. The adjustable keyboard holder assembly of claim 35 wherein said means for vertically and angularly adjusting said keyboard tray support include:
an elongated member extending beneath said keyboard tray support so not to interfere with the underdesk visual display terminal; and
pivoting linkage members extending along the sides of said keyboard tray support and pivotally secured to said elongated member to allow vertical and angular adjustment of said keyboard tray support relative to said workstation.

37. The adjustable keyboard holder assembly of claim 36 wherein said elongated member extends beneath a front portion of said keyboard tray support so not to interfere with the underdesk visual display terminal.

38. The adjustable keyboard holder assembly of claim 36 wherein said pivoting linkage members are pivotal about horizontal axes adjacent a front portion of said keyboard tray support and about horizontal axes adjacent the rear of said keyboard tray support so not to interfere with the underdesk visual display terminal.

39. The adjustable keyboard holder assembly of claim 36 wherein said horizontal adjusting means include:
roller tracks extending beneath the upper surface of said computer workstation and along the sides of the underdesk visual display terminal; and
rollers mounted on said pivoting linkage members to allow horizontal adjustment of said keyboard tray support.

40. The adjustable keyboard holder assembly of claim 36 wherein said vertical and angular adjustment means include:
means for frictionally clamping said keyboard tray support relative to said elongated member to prevent pivoting movement of said keyboard tray support on said elongated member; and
a single actuator for disengaging said frictional clamping means to allow adjustment of the vertical and angular position of said keyboard tray support and for engaging said frictional clamping means to lock said keyboard tray support in a selected vertical and angular position.

41. The adjustable keyboard holder assembly of claim 40 wherein said means for frictionally clamping said keyboard tray support includes:
friction washers mounted between said means for pivotally mounting said keyboard tray support on said elongated member;
spring members for resiliently biasing said friction washers against said pivotally mounting means to clamp said keyboard tray support in place; and
said means on said single actuator operatively engages said spring members to remove said resilient biasing on said friction washers to allow vertical and angular adjustment of said keyboard tray support and disengages said spring members to replace said resilient biasing against said friction washers to lock said keyboard tray support in a selected vertical and angular position.

42. The adjustable keyboard holder assembly of claim 40 wherein said single actuator includes:
a lever rotatably mounted on said elongated member;
a first cam surface formed on said lever;
a second cam surface formed on a portion of said elongated member adjacent said first cam surface wherein said first cam surface engages said second cam surface as said lever is rotated relative to said elongated member to move said elongated member along its longitudinal axis to remove the resilient bias of said spring members against said friction washers.

43. The adjustable keyboard holder assembly of claim 35 wherein said adjustable keyboard holder assembly includes:
a single actuator for releasing said vertical and angular adjusting means for adjustment and for locking said vertical and angular adjusting means in a selected vertical and angular position.

* * * * *